Feb. 24, 1931. P. WEINSTEIN 1,793,980
FOLDING DRIER REEL FOR FISHING LINES
Filed Nov. 15, 1930
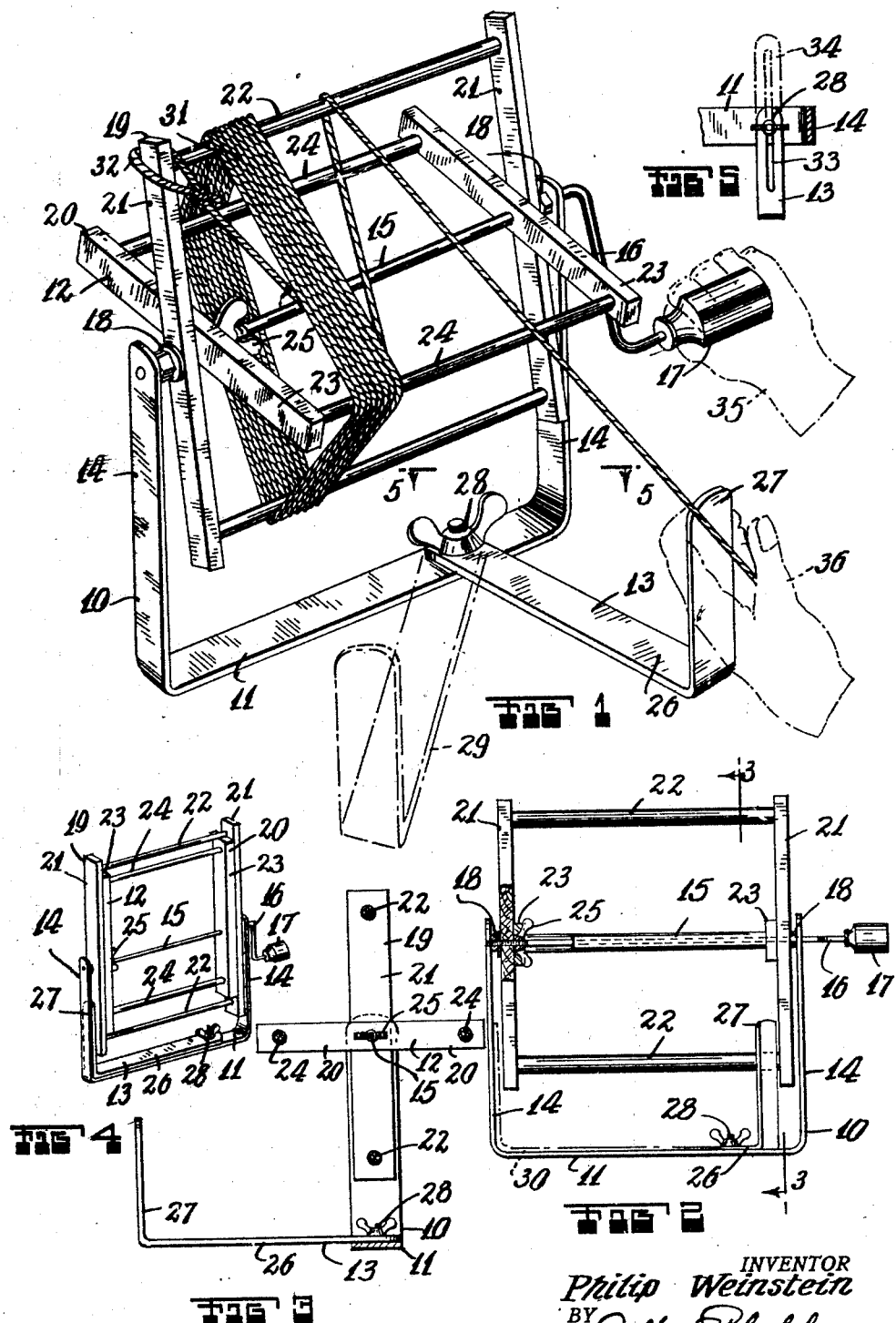
INVENTOR
Philip Weinstein
BY
ATTORNEY Patented Feb. 24, 1931

1,793,980

UNITED STATES PATENT OFFICE

PHILIP WEINSTEIN, OF NEW YORK, N. Y.

FOLDING DRIER REEL FOR FISHING LINES

Application filed November 15, 1930. Serial No. 495,847.

This invention relates to new and useful improvements in a folding drier reel for fishing lines.

The invention has for an object the provision of a handle pivotally mounted to swing in an arc on a frame supporting a reel whereby cord from the reel may be held against the handle and the handle moved to direct close winding of the cord on the reel.

It is another object of this invention to construct the said frame flat and to arrange the handle to act as a support and hold the frame vertically when in a transverse position.

A still further object of this invention is to arrange the handle to assume a position within the frame for providing a small compass while storing the device.

A still further object of this invention is to arrange the pivot point of the handle offset relative to the center line of the reel so that when in the operative position it is of sufficient size so as not to interfere with the turning of the reel.

A still further object of this invention is to arrange the handle movable to a position to extend on either side of the frame for supporting purposes.

And a still further object of this invention is to provide a device of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a perspective view of a device constructed according to this invention.

Fig. 2 is a side elevational view of Fig. 1 shown on a reduced scale, and a portion thereof being broken away to show interior parts.

Fig. 3 is a transverse sectional view taken on the line 3—3 of Fig. 2.

Fig. 4 is a perspective view similar to Fig. 1, but illustrated on a reduced scale and showing the device collapsed in condition for shipping.

Fig. 5 is a fragmentary sectional view as though taken on the line 5—5 of Fig. 1, but illustrating a modification.

The folding drier reel for fishing lines comprises a flat frame 10 with a base portion 11, a line reel 12 rotatively mounted on the frame 10 and adapted to collapse into the plane of the said frame and having its axis of rotation in said plane, and a handle 13 pivotally mounted on the base portion 11 and extending substantially transversely of said plane for manual positioning for directing close winding of line upon said reel and for supporting said frame.

The frame 10 is of substantially U shape form and preferably made from a metallic strip, the arms of the U shape being indicated by reference numerals 14 and the base by the said reference numeral 11. The base is flat so that the frame may rest upon some flat surface. The rotative mounting of the reel 12 is accomplished by a horizontal axle 15 rotatively mounted between the arms 14. One end of this axle projects from the outer face of the arm and is bent into the shape of a crank 16. A handle 17 is arranged on the crank portion 16 for gripping and manually turning the reel. The reel 12 must be firmly fixed upon the axle 15 so as to turn upon rotation with the handle 17. Nuts 18 are engaged upon the axle 15 and hold the reel 12 slightly spaced from the arms 14 to allow rotation.

The line reel 12 should be made preferably of wood or other similar material. As shown on the drawing, it consists of an outer reel section 19 and an inner reel section 20. The outer section 19 is composed from a pair of straight sides 21 engaged at their centers upon the axle 15. Side bars 22 are connected between the ends of the straight sides 21. The inner reel section 20 is composed of straight sides 23 mounted intermediately of their ends upon the axle 15 immediately adjacent the inner faces of the sides 21. Bars 24 are connected between the ends of the sides 23.

The side bars 22 are preferably made of wood but may also be made of any other suitable rust-proof material.

The inner reel section 20 is rotatively mounted upon the axle 15 and a wing nut 25 is threadedly engaged upon the axle so that it may be turned down against one of the side members 20 of the inner reel section to clamp it firmly against the outer reel section so that both sections turn in unison. The inner reel section is of smaller length than the outer reel section so that the parts may be moved into the same plane, as clearly illustrated in Fig. 4. From an inspection of Fig. 3, it will be noticed that the side members 20 are of a length so as to fit in between the bars 22 of the outer reel section.

The handle 13 is formed from a strip of metal bent so as to have a horizontal bottom portion 26 and a vertical end portion 27. The free end of the bottom portion 26 is pivotally mounted by a wing nut 28 upon the base portion 11 of the frame. Dot and dash lines 29 in Fig. 1 indicate a pivoted position of the handle 13. It should be noticed that the pivot point 28 of the handle 13 is offset relative to the center line of the frame 10 so that the horizontal portion of the handle 13 may be of sufficient length to not interfere with the turning of the reel 12, and at the same time to be capable of pivoting to a position as shown in full lines in Fig. 4, or to a position as shown by the dot and dash lines 30 in Fig. 2 wherein it is in the same plane with the frame 10. In this condition the vertical portion 27 is disposed to the inner side of one of the arms 24 and to the outer side of the reel side 19. A line 31 is shown partially wound upon the reel and the inner end 32 is shown in the form of a loop engaged upon one end of one of the sides 19.

In Fig. 5 a modified form of the device has been illustrated, in which the handle 13 is formed with a longitudinal slot 33 through which the wing nut 28 engages. This allows the handle 13 to be moved rearwards when the wing nut 28 is loosened to a position indicated by the dot and dash lines 34. In this position the handle will serve to support the frame 10 against tilting either frontwards or backwards. In other respects, this form is similar to the preferred form. Corresponding parts are indicated by the same reference numerals.

The operation of the device may be traced by assuming it in the condition shown in Fig. 1. A person may turn the crank 26 with one hand as indicated by the dot and dash lines 35 to wind the line 31 upon the reel, and with the other hand indicated by the dot and dash lines 36 hold the line in a taut position and also hold the vertical portion 27 of the handle 13 and move the handle in an arc so as to feed or guide the line 31 to wind closely upon the reel 12. After the line is dried, it may be removed and the device collapsed by first loosening the wing screw 25 and moving the sections of the reel into the same vertical positions and then next moving the handle 13 so that it is in the same plane with the frame 10.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A folding drier reel for fishing lines and the like, comprising a flat frame with a base portion, a line reel rotatively mounted on said frame and adapted to collapse into the plane of said frame and having its axis of rotation in said plane, and a handle pivotally mounted on the base portion of said frame and extending substantially transversely of said plane for manual positioning for directing close winding of line upon said reel and for supporting said frame.

2. A folding drier reel for fishing lines and the like, comprising a flat frame with a base portion, a line reel rotatively mounted on said frame and adapted to collapse into the plane of said frame and having its axis of rotation in said plane, and a handle pivotally mounted on the base portion of said frame and extending substantially transversely of said plane for manual positioning for directing close winding of line upon said reel and for supporting said frame, said handle being in the form of a strip bent so as to have a horizontal portion and an outer vertical portion whereby the vertical portion may be manually gripped and the handle pivoted for guiding line held in the hand, upon said reel, the pivoted point of said handle being off center from said frame so that the horizontal portion of the handle may be larger than if the handle were pivoted on the center line.

3. A folding drier reel for fishing lines and the like, comprising a flat frame with a base portion, a line reel rotatively mounted on said frame and adapted to collapse into the plane of said frame and having its axis of rotation in said plane, and a handle pivotally mounted on the base portion of said frame and extending substantially transversely of said plane for manual positioning for directly close winding of line upon said reel and for supporting said frame, said handle being in the form of a strip bent so as to have a horizontal portion and an outer vertical portion whereby the vertical portion may be manually gripped and the handle pivoted for guiding line held in the hand, upon said reel, the pivot point of said handle being off center from said frame so that the horizontal portion of the handle may be larger than if the handle were pivoted on the center line, the vertical portion of said handle being so positioned that the handle will move into the plane of said frame and assumes a position between said frame in said reel.

4. A folding drier reel for fishing lines and the like, comprising a flat frame with a base portion, a line reel rotatively mounted on said frame and adapted to collapse into the plane of said frame and having its axis of rotation in said plane, and a handle pivotally mounted on the base portion of said frame and extending substantially transversely of said plane for manual positioning for directing close winding of line upon said reel and for supporting said frame, said handle being in the form of a strip bent so as to have a horizontal portion and an outer vertical portion whereby the vertical portion may be manually gripped and the handle pivoted for guiding line held in the hand, upon said reel, the pivot point of said handle being off center from said frame so that the horizontal portion of the handle may be larger than if the handle were pivoted on the center line, the vertical portion of said handle being so positioned that the handle will move into the plane of said frame and assumes a position between said frame in said reel, the reel being spaced from the sides of the frame so as to provide a space into which the vertical portion of said handle may engage.

5. A folding drier reel for fishing lines and the like, comprising a flat frame with a base portion, a line reel rotatively mounted on said frame and adapted to collapse into the plane of said frame and having its axis of rotation in said plane, and a handle pivotally mounted on the base portion of said frame and extending substantially transversely of said plane for manual positioning for directing close winding of line upon said reel and for supporting said frame, said handle being formed with an elongated slot connecting with its pivot point so as to allow the handle to be extended simultaneously from both sides of the frame for suporting said reel.

6. In a reel for drying fishing lines or the like, a support, a shaft rotatable therein, a rectangular frame rigid thereon, a smaller rectangular frame loose thereon, and means surrounding the shaft within the frames for forcing the frames together so that they move together with the shaft in any adjusted position.

7. A reel for drying fishing line or the like, a support therefor, a handle for supporting the reel pivoted to the support to swing while the reel is operated to control the winding of the line and means at the pivot to fasten the hand hold in any adjusted position.

8. A reel for drying fishing line or the like arranged to collapse one part within the other so as to lie in one plane, a support in said plane, a handle for supporting the reel pivoted so as to lie in said plane or to extend at an angle thereto to control the winding of the line during the reeling operation.

In testimony whereof I have affixed my signature.

PHILIP WEINSTEIN.